Patented Dec. 7, 1948

2,455,674

UNITED STATES PATENT OFFICE 2,455,674

LIGHT STABLE COMPOSITIONS COMPRISING POLYMERIC VINYLIDENE CHLORIDE AND 2-HYDROXY-5-CHLORO-BENZOPHENONE-2'-CARBOXYLIC ACID

Carl B. Havens, Hope, Mich., assignor to The Dow Chemical Company, Midland, Mich., a corporation of Delaware No Drawing. Application December 8, 1947,
Serial No. 790,436

4 Claims. (Cl. 260—86)

This invention relates to compositions comprising polymeric vinylidene chloride of improved light stability. It relates in particular to compositions comprising any polymeric body in which vinylidene chloride is present to a substantial extent (of, for example, 10 per cent or more) and, as a light stabilizer for such compositions, a small amount of 2-hydroxy-5-chloro-benzophenone-2'-carboxylic acid.

It is well known that, especially in the thin sections found in films, coatings, or filaments, polymeric bodies containing substantial amounts of vinylidene chloride are subject to darkening and decomposition when exposed for prolonged periods to the effects of light. Numerous protective agents have been proposed to overcome or to reduce this difficulty. One of the more effective such agents has been 2,2'-dihydroxy benzophenone, but in stabilizing concentrations it contributes an intense yellow color to the composition. Among the colorless compounds having light stabilizing action for other chlorine-containing polymers such as polyvinyl chloride are the salicylates, such as salol, but these compounds are not particularly effective alone as light stabilizers for vinylidene chloride polymers.

It is among the objects of the present invention to provide a vinylidene chloride polymer composition containing a light stabilizer which will not only afford the desired protection against discoloration and decomposition due to light but will accomplish this result without itself discoloring the composition. A related object is to provide such a composition which is stable to natural sunlight as well as to artificially generated ultraviolet radiations, so that the composition will not be unduly limited as to its fields of use.

I have found that the desired effect is obtained when a small amount of 2-hydroxy-5-chloro-benzophenone-2'-carboxylic acid is compounded with a polymeric body containing 10 per cent or more of vinylidene chloride polymerized therein. While this compound is not as effective on an equal weight basis as is the previously mentioned 2,2'-dihydroxy benzophenone, it is found that 3 per cent of the new stabilizer is as effective a protectant as 1 per cent of the old one and imparts no more color to the composition than does 0.1 per cent by weight of said 2,2'-dihydroxy benzophenone. For most purposes, an amount of the new stabilizer from 1 to 5 per cent of the weight of polymer is sufficient, and amounts up to 10 per cent may be used if desired.

The new stabilizer may be added to and mixed with the polymeric body in any manner which will accomplish a thorough blending of the constituents. They may be blended in solid form in a ball mill or other mixer, or the stabilizer may be dissolved and worked into the polymer on cold or hot compounding rolls. When the composition so-produced is fabricated in known manner to make a filament, film sheet, coating, or molded article, and is exposed to natural or artificial light, the product resists discoloration for periods up to several months. By way of contrast, the untreated polymer, in the same physical form, when exposed to the same light source will soon display a dark brown to black coloration.

The following table illustrates the efficacy of the new stabilizer. Various amounts of 2-hydroxy-5-chloro-benzophenone-2'-carboxylic acid were added to and mixed thoroughly with different portions of a copolymer containing about 92 per cent vinylidene chloride and about 8 per cent vinyl chloride, plasticized with 7 per cent of its weight of di-(alpha-phenylethyl) ether. The compositions were made into flow moldings having a thickness of 0.010 inch. The moldings were exposed outdoors to direct Florida sunlight for the indicated period. Samples of each molding were tested before and after exposure to determine their ability to transmit light of 5600 Å. wavelength. The smaller the change after exposure, the more effective was the amount of stabilizer employed in that composition.

| Amount of Stabilizer, Per Cent | Visible Light Transmitted Through Sample, Per Cent | | Retention of Ability to Transmit Light, Per Cent | Exposure Period, Days |
|---|---|---|---|---|
| | Before Exposure | After Exposure | | |
| None | 81 | 25 | 31 | 68 |
| 1.25 | 78 | 42 | 54 | 200 |
| 2.50 | 83 | 42 | 51 | 200 |
| 5.0 | 83 | 60 | 72 | 200 |
| 10.0 | 72 | 56 | 78 | 200 |

The foregoing and other tests, both with indoor and outdoor exposure, respectively, to artificial and natural light, have shown that from 1 to 5 per cent of the stabilizer of this invention, added to the vinylidene chloride-containing polymer, affords a satisfactory degree of protection without imparting the undesirable color inherent in the use of some of the previously disclosed stabilizers.

The invention is not limited in its application to the specific illustrative copolymer of the example, but is applicable to any polymeric product containing a substantial amount, 10 per cent or more, of vinylidene chloride polymerized therein. The polymeric product need not be used for extrusion or molding operations, but may be of the type which is soluble in organic solvents and suitable for use in lacquers or other coating compositions, in which case the stabilizer may be dissolved or dispersed in the liquid vehicle from which the coating is deposited.

I claim:

1. A composition of matter comprising a polymer containing at least 10 per cent of vinylidene chloride polymerized therein and, from 1 to 10 per cent of 2-hydroxy-5-chloro-benzophenone-2'-carboxylic acid to stabilize the polymer against the injurious effects of light.

2. A composition of matter comprising a polymer containing at least 10 per cent of vinylidene chloride polymerized therein and, from 1 to 5 per cent of 2-hydroxy-5-chloro-benzophenone-2'-carboxylic acid to stabilize the polymer against the injurious effects of light.

3. A composition of matter comprising a copolymer of at least 10 per cent vinylidene chloride, balance vinyl chloride, and from 1 to 10 per cent, based on the weight of the copolymer, of 2-hydroxy-5-chloro-benzophenone-2'-carboxylic acid to stabilize the polymer against the injurious effects of light.

4. A composition of matter comprising a copolymer of at least 10 per cent vinylidene chloride, balance vinyl chloride, and from 1 to 5 per cent, based on the weight of the copolymer, of 2-hydroxy-5-chloro-benzophenone-2'-carboxylic acid to stabilize the polymer against the injurious effects of light.

CARL B. HAVENS.

No references cited.